(12) United States Patent
McKone et al.

(10) Patent No.: US 8,809,843 B2
(45) Date of Patent: Aug. 19, 2014

(54) NICKEL-BASED ELECTROCATALYTIC PHOTOELECTRODES

(75) Inventors: James R. McKone, Pasadena, CA (US);
Harry B. Gray, Pasadena, CA (US);
Nathan S. Lewis, La Canada, CA (US);
Bruce Brunschwig, Pasadena, CA (US);
Emily L. Warren, Pasadena, CA (US);
Shannon W. Boettcher, Eugene, OR (US); Matthew J. Bierman, Bay City, MI (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/491,253

(22) Filed: Jun. 7, 2012

(65) Prior Publication Data
US 2012/0313073 A1  Dec. 13, 2012

Related U.S. Application Data

(60) Provisional application No. 61/494,297, filed on Jun. 7, 2011.

(51) Int. Cl.
*H01L 35/24* (2006.01)
*H01L 51/00* (2006.01)

(52) U.S. Cl.
USPC .................. 257/40; 257/14; 257/E39.007

(58) Field of Classification Search
USPC ............... 257/24, 14, 40, E39.007; 438/504; 204/242, 248
See application file for complete search history.

(56) References Cited

U.S. PATENT DOCUMENTS

| | | | |
|---|---|---|---|
| 7,338,590 B1 * | 3/2008 | Shelnutt et al. | 205/628 |
| 2009/0020150 A1 * | 1/2009 | Atwater et al. | 136/246 |
| 2011/0253982 A1 * | 10/2011 | Wang et al. | 257/24 |

OTHER PUBLICATIONS

N. Getoff, Development of multilayer semiconductor electrodes—Silicon for Hydrogen production, 1994, Int. J. Hydrogen Energy, vol. 19, No. 2, pp. 145-149.*
S. U. M. Khan, Optimization of p-silicon surface by etching and electrodeposition of Pt and Ni for photosplitting of water, 1989, Int. J. Hydrogen Energy, vol. 14, No. 9, pp. 653-660.*
Yao Suwei, Preparation and property of Ni-Mo/P-Si electrode materials, Chinese journal of material research, Feb. 1002, vol. 16, No. 1, pp. 83-87.*

* cited by examiner

*Primary Examiner* — Hoai V Pham
(74) *Attorney, Agent, or Firm* — Joseph R. Baker, Jr.; Gavrilovich, Dodd & Lindsey LLP

(57) ABSTRACT

A photoelectrode, methods of making and using, including systems for water-splitting are provided. The photoelectrode can be a semiconductive material having a photocatalyst such as nickel or nickel-molybdenum coated on the material.

9 Claims, 7 Drawing Sheets

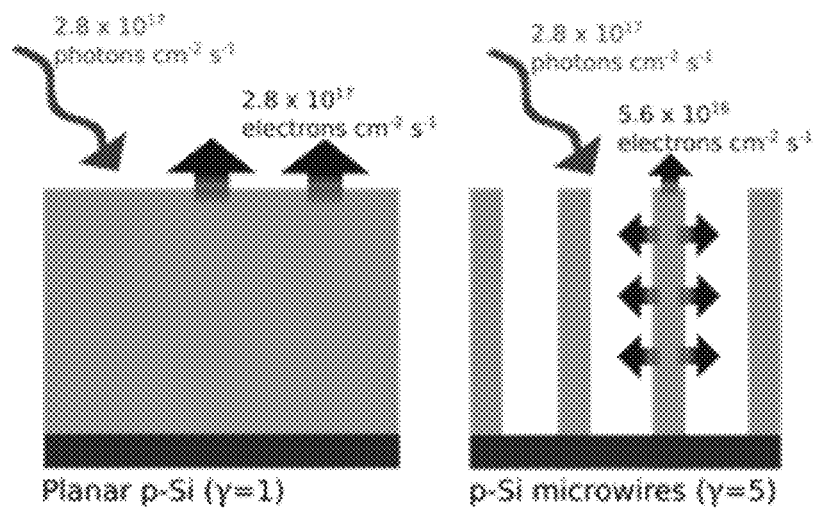
FIGURE 1
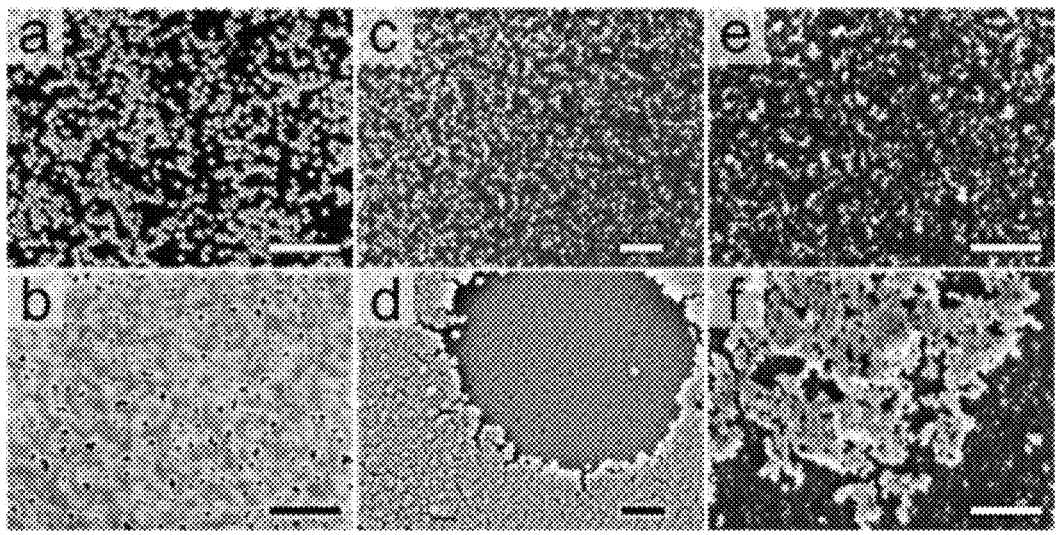
FIGURE 2A-F

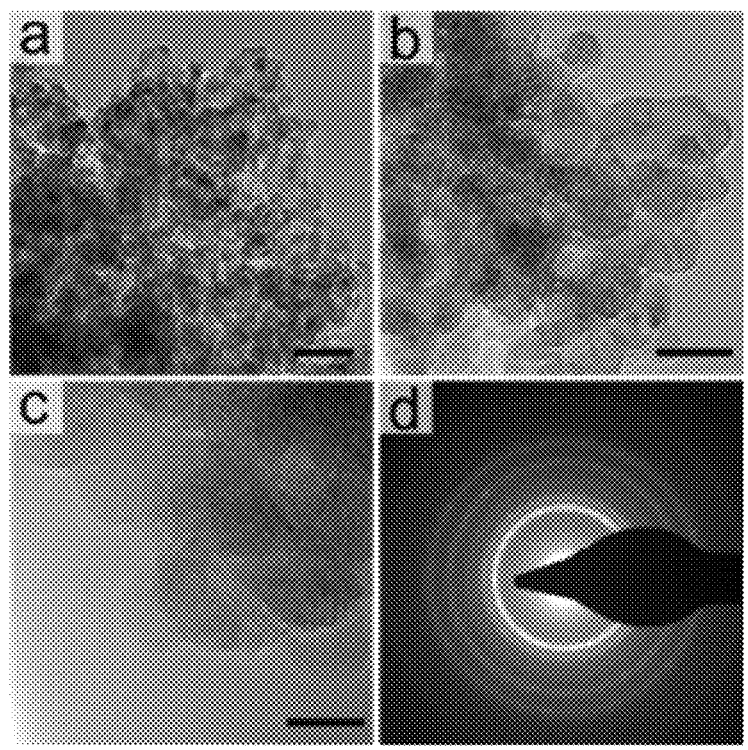
FIGURE 3A-D
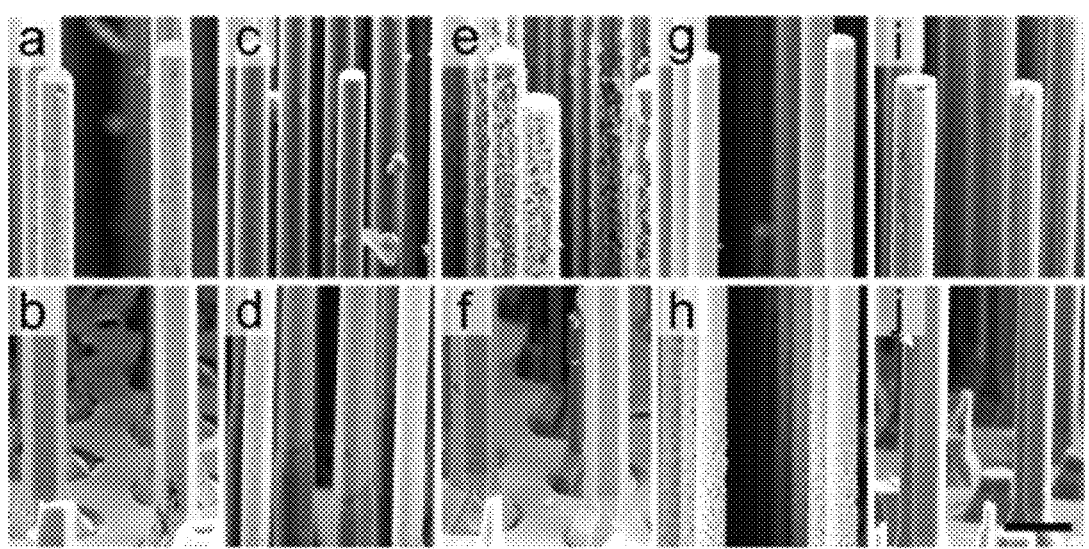
FIGURE 4A-J

NICKEL-BASED ELECTROCATALYTIC PHOTOELECTRODES

CROSS REFERENCE TO RELATED APPLICATIONS

This application claims priority to U.S. Provisional Application Ser. No. 61/494,297, filed Jun. 7, 2011, the disclosure of which is incorporated herein by reference.

STATEMENT REGARDING FEDERALLY SPONSORED RESEARCH

This invention was made with government support under Grant Nos. CHE-0802907 and CHE-0947829 awarded by the National Science Foundation. The Government has certain rights in the invention.

TECHNICAL FIELD

This invention relates to compositions and methods for water splitting and hydrogen production.

BACKGROUND

The global energy challenge is universal, and a transfer to alternative sustainable energy sources, in particular the sun, is inevitable. One requirement for current energy consumption is that the energy be available not only during sunlight hours, but also during the evening and night when the sunlight is not available. Thus, methods for storing energy in both electrical and chemical forms are desirable. Efforts are being made to store hydrogen as a source of energy. An ideal process for hydrogen production is to use water as a hydrogen source together with solar energy for conversion. Accordingly, photocatalytic water splitting (which is the light-induced conversion reaction of water to hydrogen and oxygen) has attracted attention as one of the most promising hydrogen production processes.

Efficient water splitting, using photocatalysts, has been a huge challenge for researchers. Moreover, water splitting by using a renewable form of energy is possibly the ultimate solution to environmental and energy issues. Nevertheless, the development of inexpensive, readily available and highly active photocatalysts for water splitting has limited development.

SUMMARY

The disclosure provides a photoelectrode comprising a semiconducting substrate coated with a nickel or nickel-molybdenum metal catalyst. In one embodiment, the semiconducting substrate comprises silicon. In another embodiment, the photoelectrode is a photocathode. In yet another embodiment, the semiconducting substrate comprises nano- and/or micro-wires. In yet a further embodiment, the semiconducting substrate comprises an array of nano- and/or micro-wires. In one embodiment, the photoelectrode surface is 1%-99% coated with a nickel or nickel-molybdenum metal catalyst. In another embodiment, the nickel or nickel-molybdenum comprises nanoparticle islands of about 5 nm to 200 nm on the surface of the semiconducting substrate. In another embodiment, the nickel or nickel-molybdenum comprises a film over all or substantially all the surface of the semiconducting substrate.

The disclosure also provides a method of making a photoelectrode comprising a nickel and/or nickel-molybdenum catalyst. The method includes providing an electrocatalyst plating bath comprising a Nickel(II) sulfamate salt; placing a semiconducting substrate serving as an electrode and a suitable auxiliary electrode in the electrocatalyst bath; applying a constant voltage or constant current to the semiconducting substrate; and exposing the semiconducting substrate to electromagnetic illumination, wherein the photoelectrode is coated with a photocatalyst comprising nickel. In one embodiment, the method further comprises adding molybdenum to the plating bath. In yet further embodiment, the molybdenum is in the form of sodium molybdate. In yet another embodiment, the method comprises adding a small amount of boric acid to the bath as a stabilizer. In yet a further embodiment, the method includes adjusting the pH with sulfamic acid or sodium hydroxide. In yet another embodiment, the semiconducting substrate comprises an array of silicon nano- or micro-wires. In one embodiment, the auxilliary electrode is a Ni foil. In yet another embodiment, the current between the semiconducting substrate and the auxiliary electrode is between about 1 and 100 mA of cathodic current for every $cm^2$ of macroscopic surface area of the semiconducting substrate surface to be coated.

The disclosure also provides a photoelectrode made by the method described above.

The disclosure also provides a photocell for conversion of water to hydrogen comprising: a photoanode comprising one or more ordered wire arrays comprising a plurality of elongate photoanode semiconductor wires, wherein the photoanode semiconductor wires are oriented to receive incident light; a photocathode comprising one or more ordered wire arrays comprising a plurality of elongate photocathode semiconductor wires, wherein the photocathode semiconductor wires are oriented to receive incident light; and a film electrically and ionically interconnecting the a plurality of the photoanode semiconductor wires to a plurality of the photocathode wires and wherein the photocathode and/or photoanode are coated with nickel or nickel-molybdenum. In one embodiment, the film comprises a flexible composite polymer film. In another embodiment, the film prevents mixing of gaseous products.

BRIEF DESCRIPTION OF THE DRAWINGS

FIG. 1 shows the relationship between the incident photon flux and outgoing electron flux in a conventional crystalline Si absorber (left), and a crystalline Si microwire array (right) under AM 1.5 illumination, assuming unity absorption above the Si bandgap and unity quantum yield for charge carrier collection. The microwire array produces a smaller electron flux per absorber surface area, even for the same incident photon flux, due to the roughness factor of γ=5 that results from its microstructured geometry.

FIG. 2A-F shows scanning electron micrographs of catalyst particles on planar Si surfaces: (a) Ni deposited for 0.5 s; (b) Ni deposited for 1.0 s; (c) Ni—Mo deposited for 30 s; (d) Ni—Mo deposited for 90 s; (e) electroless Pt deposited for 360 s (f) same as e, but showing a Pt agglomerate. The scale bar in each pane is 1 μm.

FIG. 3A-D show TEM images (a-c) and (d) electron diffraction pattern of a Ni—Mo film that was electrodeposited onto a p$^+$-Si electrode. The images indicate that the Ni—Mo deposits were agglomerates of <10 nm crystallites. Scale bars: (a) 20 nm; (b) 10 nm; (c) 5 nm.

FIG. 4A-J shows scanning electron micrographs of catalyst particles on Si microwire tops (above) and bases (below): (a, b) p$^+$-Si deposited with Ni for 5 s; (c, d) p-Si deposited with Ni for 1 s; (e, f) p$^+$-Si deposited with Ni—Mo for 90 s; (g, h)

p-Si deposited with Ni—Mo for 20 s; (i, j) p+-Si deposited with electroless Pt for 360 s. The scale bar in (j) is 3 μm, and applies to all panels.

Figure 5:
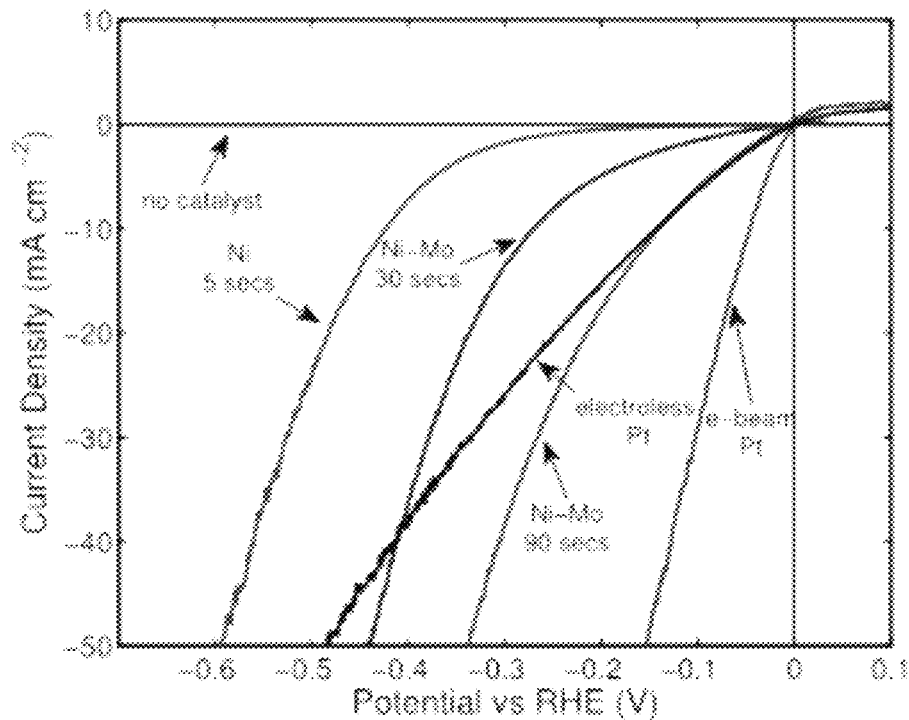

FIG. 5 is a graph depicting polarization data of the HER activities of various catalysts on planar p+-Si electrodes. The total deposition times for electrodeposited catalyst films are specified. Data were collected at pH=4.5, and are referenced to the RHE potential.

Figure 6:
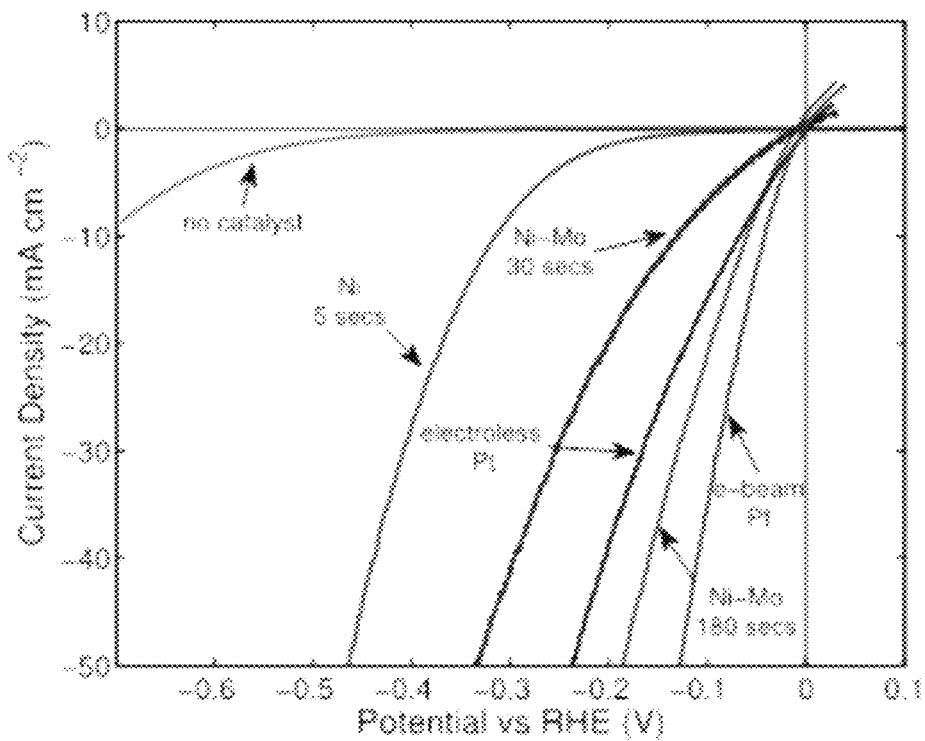

FIG. 6 is a graph showing polarization data of the HER activities of various catalysts on p+-Si microwire electrodes. The total deposition times for electrodeposited catalyst films are specified. Data were collected at pH=4.5, and are referenced to the RHE potential.

Figure 7:
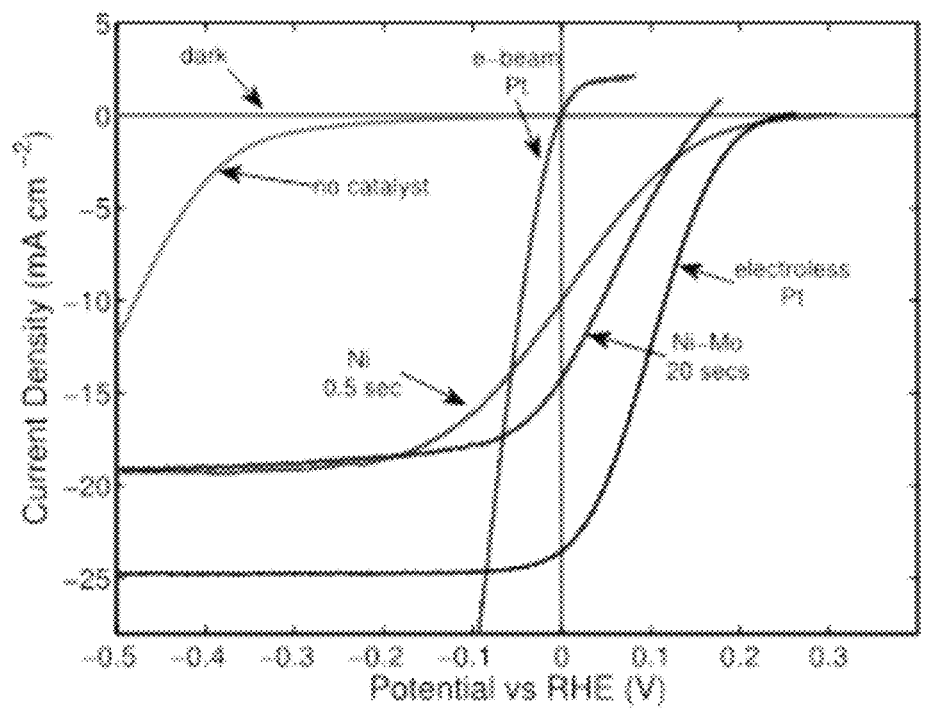

FIG. 7 is a graph depicting polarization data of the HER activities of various catalysts on illuminated planar p-Si photoelectrodes. The total deposition times for electrodeposited catalyst films are specified. Data were collected at pH=4.5, and are referenced to the RHE potential.

Figure 8:
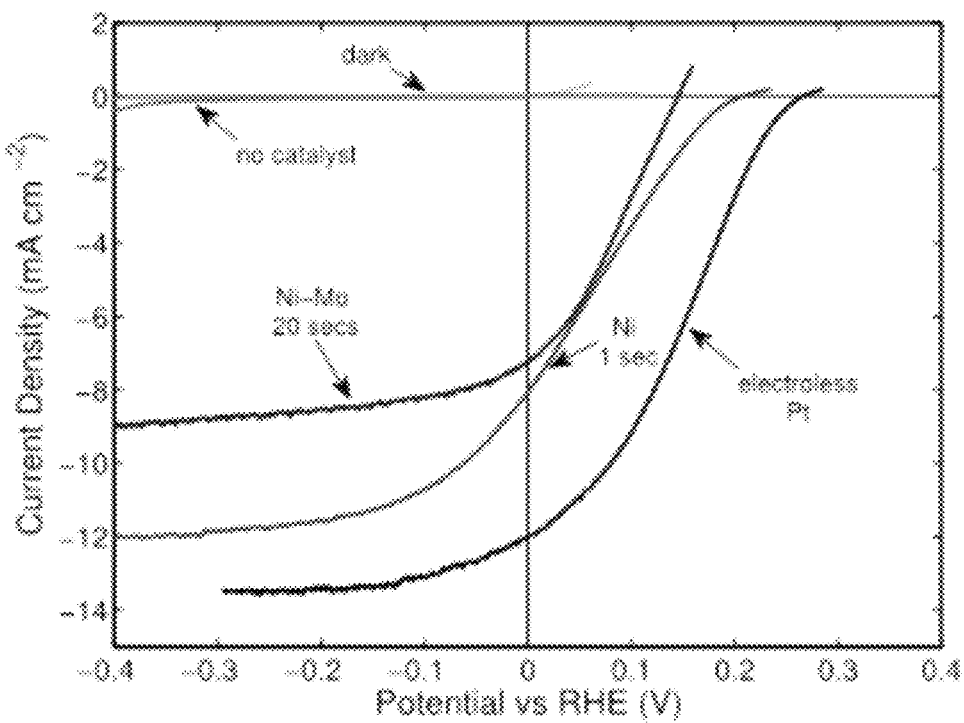

FIG. 8 is a graph depicting polarization data of the HER activities of various catalysts on illuminated p-Si microwire array photoelectrodes. The total deposition times for electrodeposited catalyst films are specified. Data were collected at pH=4.5, and are referenced to the RHE potential.

Figure 9:
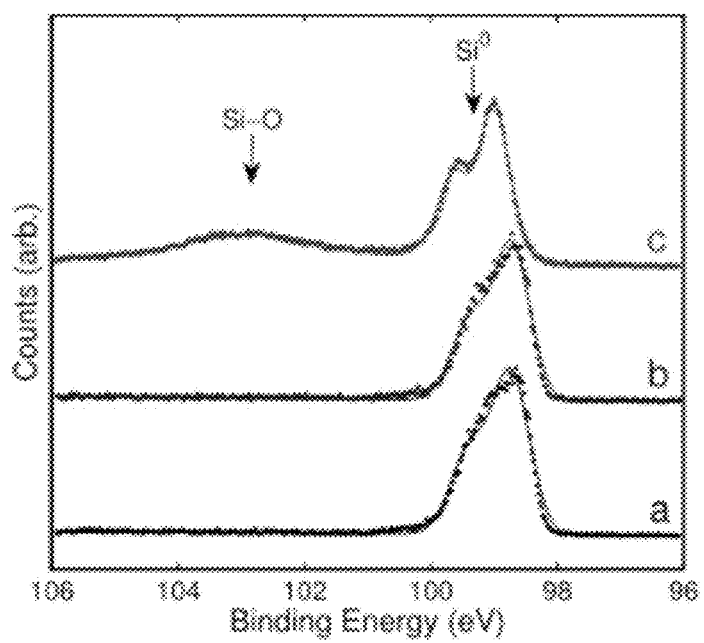

FIG. 9 shows XP spectra of the Si 2p region of three p+-Si samples: (Line a) control sample with no deposition; (Line b) coated with Pt via e-beam evaporation; (c) coated with Pt via electroless deposition. In all three cases, samples were treated in nominally the same fashion, other than the deposition conditions, and were freshly etched in buffered HF(aq) immediately before introduction into the analysis chamber. Sample (Line c) showed significant surface oxidation, while samples (Line a) and (Line b) showed little to no detectable oxidized Si signals.

Figure 10:
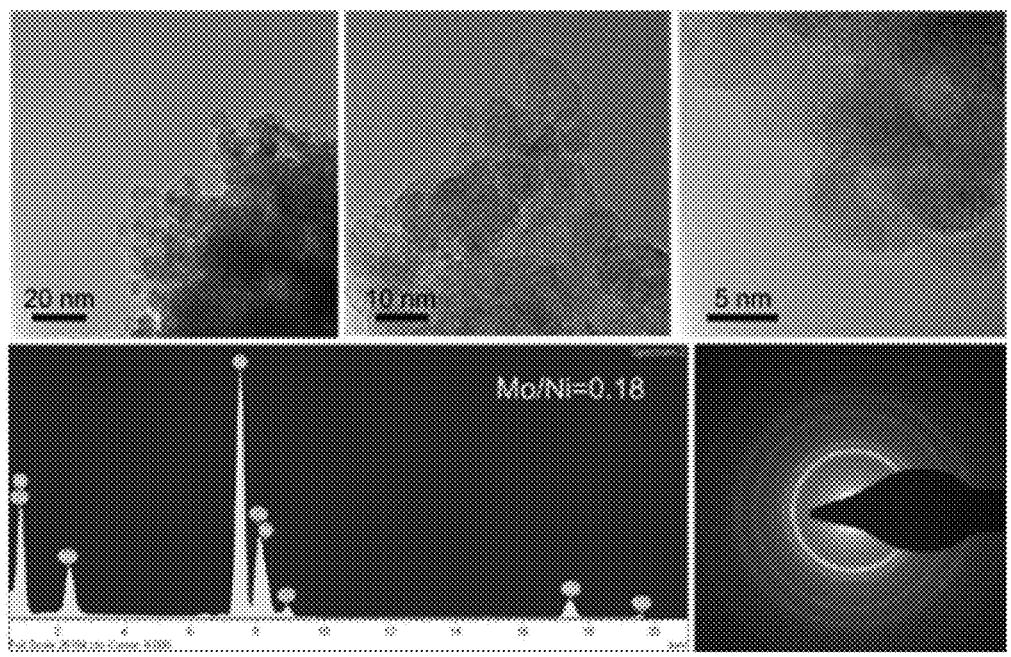

FIG. 10 shows TEM, EDS data, and electron diffraction data for electrodeposited films of Ni (top) and Ni—Mo alloy (bottom). Scale bars are as noted.

Figure 11:
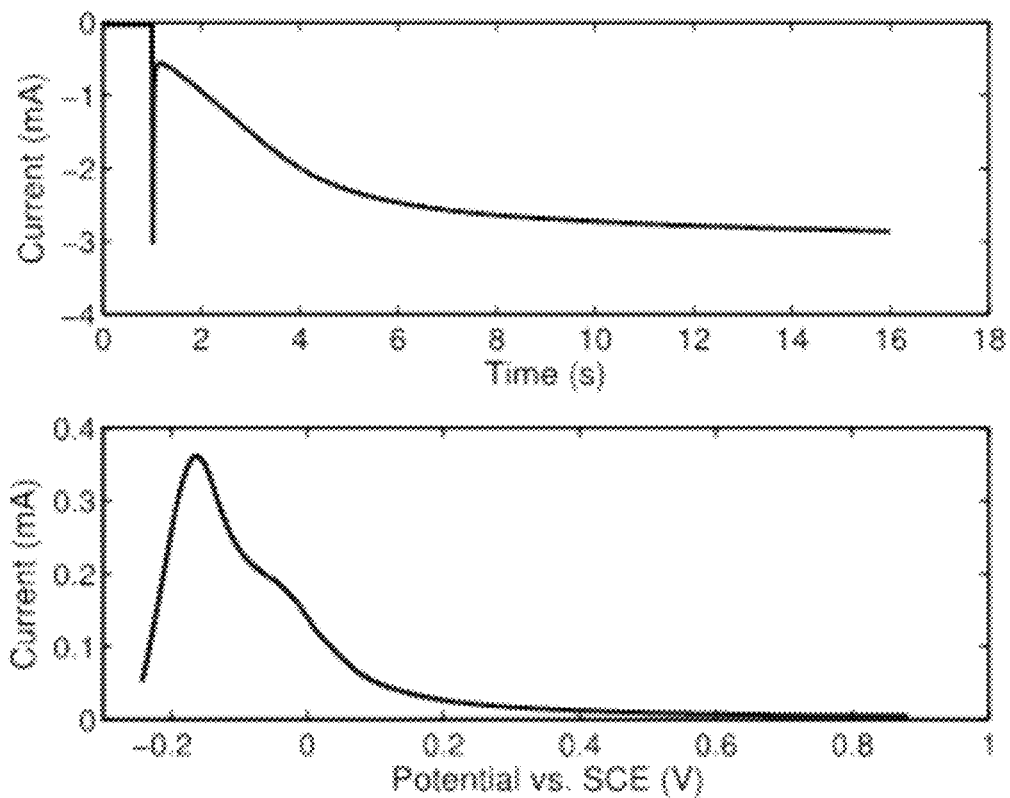

FIG. 11 shows an example of J-t data for deposition (top) and J-E data for stripping (bottom) of Ni—Mo alloy using a fluorine-doped tin oxide (FTO) glass electrode.

Figure 12:
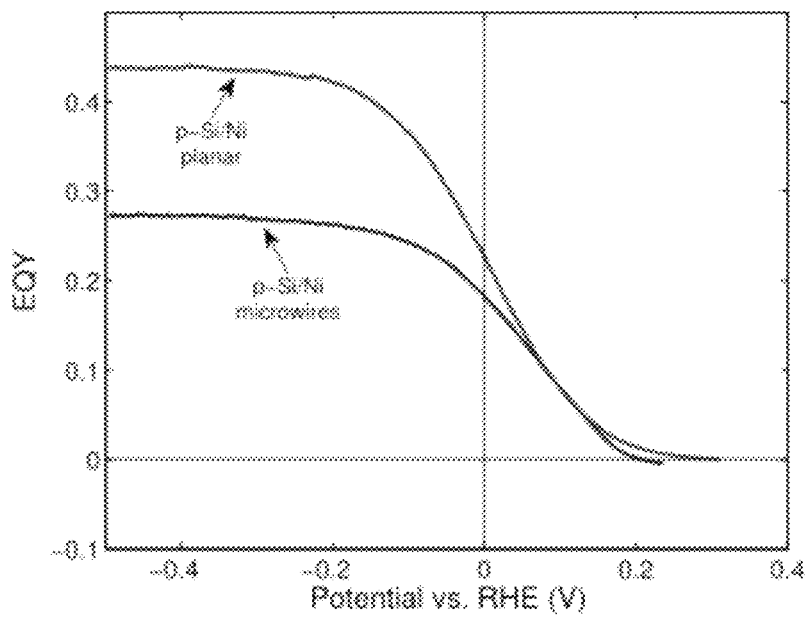

FIG. 12 shows EQY-E curves for planar and microwire p-Si electrodes deposited with Ni catalyst.

Figure 13:
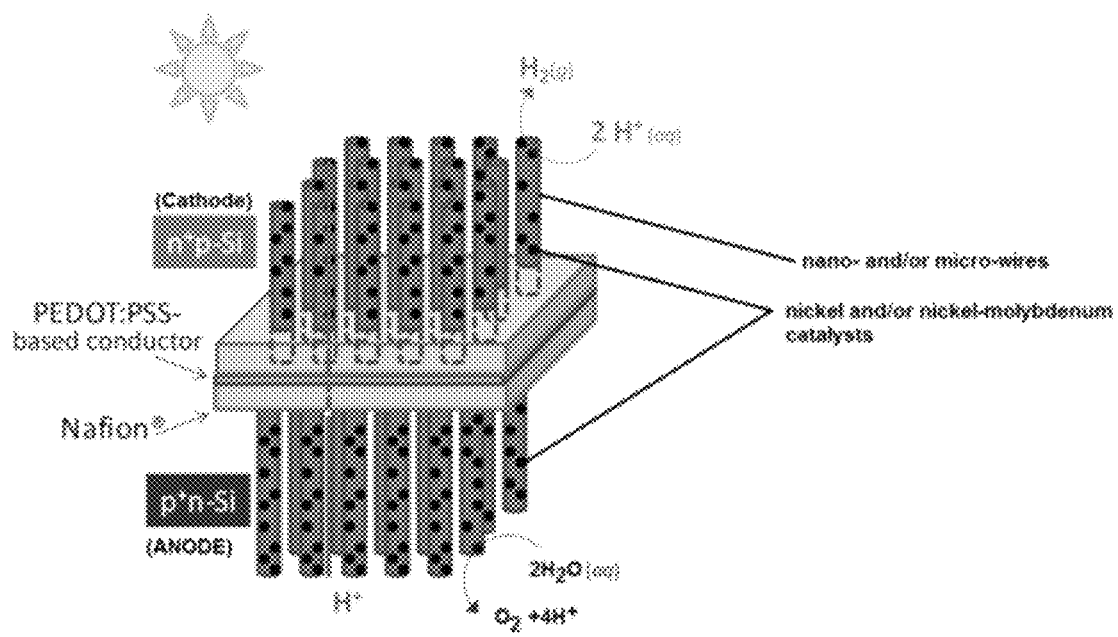

FIG. 13 depicts a photocatalytic system of the disclosure for water-splitting.

DETAILED DESCRIPTION

As used herein and in the appended claims, the singular forms "a," "and," and "the" include plural referents unless the context clearly dictates otherwise. Thus, for example, reference to "a pillar" includes a plurality of such pillars and reference to "the catalyst" includes reference to one or more catalysts known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

By "about" is meant a quantity, level, value, number, frequency, percentage, dimension, size, amount, weight or length that varies by as much as 30, 25, 20, 25, 10, 9, 8, 7, 6, 5, 4, 3, 2 or 1% to a reference quantity, level, value, number, frequency, percentage, dimension, size, amount, weight or length.

With respect to ranges of values, the invention encompasses each intervening value between the upper and lower limits of the range to at least a tenth of the lower limit's unit, unless the context clearly indicates otherwise. Further, the invention encompasses any other stated intervening values. Moreover, the invention also encompasses ranges excluding either or both of the upper and lower limits of the range, unless specifically excluded from the stated range.

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

The publications discussed above and throughout the text are provided solely for their disclosure prior to the filing date of the present application. Nothing herein is to be construed as an admission that the inventors are not entitled to antedate such disclosure by virtue of prior disclosure.

An approach to artificial photosynthesis involves the use of semiconductors to capture and convert sunlight into charge-separated electrons and holes. The separated charge carriers are then coupled to suitable electrocatalysts to facilitate multi-electron transfer processes that effect, at low overpotentials, the oxidation of water to $O_2(g)$ and the reduction of water to $H_2(g)$. Semiconductor photocathodes have shown high efficiency for production of $H_2(g)$ from $H_2O$, with nearly unity internal quantum yields throughout the visible region of the solar spectrum. For example, p-InP/Rh photocathodes have yielded 11% thermodynamically based energy conversion efficiencies of HCl(aq) to $H_2(g)$. Additionally, p-type Si photocathodes with an overlayer of Pt nanoparticles have been shown to produce >5% thermodynamically based conversion efficiency of protons to $H_2(g)$ under low-level monochromatic (632 nm) light in mildly acidic aqueous solution. Several devices that have incorporated multi-junction semiconductor photoelectrodes have effected the overall solar-driven splitting of water to $H_2(g)$ and $O_2(g)$ with >5% efficiency.

A globally scalable system for production of $H_2(g)$ from sunlight and $H_2O$ will require light absorbers and electrocatalysts that are made from earth-abundant materials. In this respect, photocathodes formed from Si microwire arrays are attractive. The microwire array geometry orthogonalizes the directions of light absorption and charge-carrier collection, thereby facilitating the use of materials that have relatively low minority-carrier collection lengths. Such materials, in turn, can be grown using high growth rate methods such as the vapor-liquid-solid growth technique. Exploitation of the orthogonalization approach has to date yielded Si microwire array-based radial $n^+$-p junction photovoltaic devices that, while only absorbing 60% of the light, have resulted in 7% solar energy conversion efficiencies under simulated Air Mass (AM) 1.5 illumination conditions. Radial $n^+$-p junction Si microwire array photocathodes that have been decorated with islands of Pt as an electrocatalyst have yielded, with only ~50% light absorption, >5% thermodynamically based energy conversion efficiencies for the production of $H_2(g)$ from 0.5 M $H_2SO_4$(aq) under simulated AM 1.5 illumination. A goal is therefore to use earth-abundant electrocatalysts to achieve performance for $H_2(g)$ evolution that is comparable to that obtainable using Pt or Pd as electrocatalysts.

The use of microwire arrays, or electrodes that have a high ratio of their internal surface area to their projected, geometric area (i.e. a large roughness factor, γ) relaxes the constraints on catalyst activity that are needed to produce, at low overpotentials, fuels from sunlight. In an optimally operating tandem light absorbing structure under 1 Sun of AM 1.5 illumination, the solar photon flux will produce a charge-carrier flux of ~10-20 mA cm$^{-2}$ to a planar electrode surface. This flux dictates the electrocatalytic activity necessary under unconcentrated AM 1.5 sunlight for an efficient sunlight-driven water splitting system. Materials that have high γ values should relax this constraint on the needed catalytic activity, because the photogenerated charge-carrier flux can be distributed over a high internal surface area (FIG. 1). Hence for photoelectrodes with a high γ value, a lower inherent electrocatalytic activity is required to support the photogenerated charge-carrier flux relative to that needed to produce efficient planar photoelectrode. Stated differently, electrodes with high γ values provide an increased number of catalytic centers, and therefore lower the turnover frequency required of each catalyst unit.

In one embodiment, the disclosure provides nickel (Ni) electrocatalyst on a planar or substantially planar semiconducting substrate for water splitting. In some embodiments, the Ni electrocatalyst further comprises molybdenum (Mo). In certain embodiments, the semiconducting substrate is a silicon-based substrate.

In one embodiment, the disclosure provides nickel (Ni) electrocatalyst on semiconducting nano- and micro-wires for water splitting. In some embodiments, the Ni electrocatalyst further comprises molybdenum (Mo). In certain embodiments, the semiconducting nano- and/or micro-wires are silicon-based wires.

Ni and Ni—Mo are known electrocatalysts for $H_2(g)$ production, and in smooth forms ($\gamma \approx 1$) have exhibited exchange current densities between $10^{-6}$ and $10^{-4}$ A cm$^{-2}$ in acidic electrolyte, compared to $10^{-3}$ A cm$^{-2}$ for Pt. Although Ni or Ni—Mo may be inferior at high current densities compared to Pt, e.g., in proton-exchange membrane (PEM) based electrolyzers, which must minimize the area-related capital expenses associated with the membrane-electrode assembly and the balance of systems in such devices, such electrocatalysts might be viable alternatives to Pt, when deposited onto Si nano- or micro-wire array photocathode surfaces.

Within this description, the terms "wires," "rods," "whiskers," and "pillars" and other similar terms may be used synonymously, except as otherwise indicated. Generally, these terms refer to elongate structures which have lengths and widths, where the length is defined by the longest axis of the structure and the width is defined by the axis generally normal to the longest axis of the structure. The term 'aspect ratio' refers to the ratio of a structure's length to its width. Hence, the aspect ratios of the elongate structures will be greater than one. The terms "ball," "spheroid," "blob" and other similar terms may also be used synonymously, except as otherwise indicated. Generally, these terms refer to structures with the width defined by the longest axis of the structure and the length defined by the axis generally normal to the width. Hence, the aspect ratio of such structures will generally be unity or less than unity. Further the term "vertical" with reference to wires, rods, whiskers, pillars, etc., generally refers to structures that have a length direction that is elevated somewhat from horizontal. The term "vertical alignment" generally refers to an alignment or orientation of a structure or structures that is elevated from horizontal. The structure or structures do not have to be completely normal to horizontal to be considered to have a vertical alignment. The term "array" generally refers to multiple numbers of structures distributed within an area and spaced apart, unless otherwise indicated. Structures within an array all do not have to have the same orientation. The terms "vertically aligned array" or "vertically oriented array" generally refer to arrays of structures where the structures have orientations elevated from a horizontal orientation up to orientations completely normal to a horizontal orientation, but the structures within the array may or may not have all the same orientations with respect to horizontal. The terms "ordered" or "well-defined" generally refer to the placement of elements in a specified or predetermined pattern where the elements have distinct spatial relationships to one another. Hence, the terms "ordered array" or "well-defined" generally refer to structures distributed within an area with distinct, specified or predetermined spatial relationships to one another. For example, the spatial relationships within an ordered array may be such that the structures are spaced apart from one another by generally equal distances. Other ordered arrays may use varying, but specified or predetermined, spacings. The structures within "ordered" or "well-defined" arrays may also have similar orientations with respect to each other.

Within this description, the term "semiconductor" or "semiconducting substrate" and the like is generally used to refer to elements, structures, or devices, etc. comprising materials that have semiconductive properties, unless otherwise indicated. Such materials include, but are not limited to: elements from Group IV of the periodic table: materials including elements from Group IV of the period table; materials including elements from Group III and Group V of the periodic table; materials including elements from Group II and Group VI of the periodic table; materials including elements from Group I and Group VII of the periodic table; materials including elements from Group IV and Group VI of the periodic table; materials including elements from Group V and Group VI of the periodic table; and materials including elements from Group II and Group V of the periodic table. Other materials with semiconductive properties may include: layered semiconductors; metallic alloys; miscellaneous oxides; some organic materials, and some magnetic materials. The term "semiconducting structure" refers to a structure consisting of, at least in part, a semiconducting material. A semiconducting structure may comprise either doped or undoped material.

Embodiments of the disclosure comprise wire arrays or other semiconducting structures with control of the size, position, and uniformity of the fabricated wire arrays or structures over a relatively wide area wherein the arrays comprise a nickel and/or nickel-molybdenum photocatalyst coated, linked, connected or otherwise dispersed on the array. Such wire arrays or structures comprise, in one embodiment, crystalline Si wires of a length long enough to absorb sunlight fully, each wire with a radius matched to its diffusion length, and the wires being regularly spaced, and oriented predominantly vertically, typically over large areas. Embodiments of the disclosure can comprise growing the wire arrays or structures through VLS processes. In such an embodiment, a templating layer is first patterned with openings (e.g., an array of holes) in which the wires or structures are to be grown. The templating layer comprises a diffusion barrier for a deposited catalyst. The diffusion barrier may comprise a patterned oxide layer, a patterned insulating layer, such as a layer comprising silicon nitride, a patterned metal layer, or combinations of these materials or other materials or processes that facilitate the deposition of the catalyst for semiconductor structure growth. The catalyst is then deposited in the openings. Wires or structures are then grown on the substrate by heating the substrate and applying a growth gas.

In one embodiment, a Si <111> wafer is used as the material from which the wire arrays are grown. Other materials may also be used to support wire growth, such as a thin Si layer disposed on glass, or other such Si substrates. All or portions of the wafer may be doped. For example, some embodiments may use a degenerately doped n-type Si wafer. In the process of a surface oxide layer is thermally gown on the wafer. In one embodiment, the surface oxide layer is grown to a thickness of 285 nm. In another embodiment, the surface oxide layer is grown to a thickness of 300 nm. Other embodiments may comprise oxide layers at other thicknesses. Still other embodiments have the oxide layer deposited via chemical vapor deposition (CVD) or other methods known in the art.

A photoresist layer is applied to support the development of a patterned template as discussed below. However, other materials and techniques for creating a patterned template may be used, such as a latex layer, or stamping or soft lithography. The photoresist layer may comprise S1813 photoresist from MicroChem Corp. (Newton, Mass., USA) or other photoresist material. The photoresist layer is then exposed to a desired array pattern and developed with a developer to form a desired pattern of holes in the resist layer. The developer may comprise MF-319 or other developers known in the art. The patterned resist layer is then used to etch the oxide layer on the Si wafer. Etching of the oxide layer may be achieved by using hydrofluoric acid compositions such as buffered HF (9% HF, 32% $NH_4F$) from Transene Company, Inc. (Danvers, Mass., USA). Other etching techniques known in the art may also be used to etch the oxide layer. The result of the etching will be a pattern of holes in the oxide layer. A pattern of holes may be, for example, a square array of 3 μm diameter holes that are 7 μm center to center.

A growth catalyst is then thermally evaporated onto the resist layer and into the holes in the oxide layer. Other methods of depositing the catalyst may be used, such as electrodeposition. Typical catalysts comprise gold, copper, or nickel, but other metals known in the art as Si V-L-S catalysts may be used, such as platinum or aluminum. For example, 500 nm of gold may be thermally evaporated onto the resist layer and into the holes. Lift-off of the photoresist layer is then performed, leaving catalyst islands separated by the oxide in the oxide layer.

The wafer with the patterned oxide layer and the deposited catalyst may then be annealed. Typically, the annealing is performed in a tube furnace at a temperature between 900 to 1000° C. or at a temperature of about 1050° C. for 20 minutes with the application of 1 atm of $H_2$ at a flow rate of 1000 sccm (where SCCM denotes cubic centimeters per minute at STP). Growth of wires on the wafer is then performed. Typically, the wires are grown in a mixture of $H_2$ (1000 sccm) and $SiCl_4$ (20 sccm) at about 1 atm. In one embodiment, the wires are grown for between 20 to 30 minutes at temperatures between 850° C. to 1100° C. Other embodiments may use different growth times, pressures, and or flow rates. However, optimal growth temperatures are between 1000° C. and 1050° C. Growth for these times and at these temperatures may produce wires from 10 μm to 30 μm in length or longer.

Following the growth of the wires, the oxide layer is removed. The oxide layer may be removed by etching the wafer for 10 seconds in 10% HF (aq) or other methods known in the art may be used to remove the oxide layer. Growth catalyst particles may remain at the top of each grown wire, which may impact the functionality of the resulting wire array. Therefore, it may be advantageous to remove the catalyst particles. For example, if the catalyst comprises Au, the gold particles may be removed by soaking the wafer 10 for 10 min in a TFA solution from Transene Company, Inc., which contains $I^-/I_3^-$. Other methods known in the art may also be used to remove catalyst particles.

The method described above has been shown to produce nearly defect-free arrays that exhibited an extremely narrow diameter and length distribution, and highly controlled wire position.

As discussed above, other growth catalysts may be used to facilitate the growth of the Si wires in the wire array. Nominally identical wire arrays may be obtained when Cu, Ni, Pt, or Al (or other Si growth catalyst metals) are used as the VLS growth catalyst instead of Au.

Use of the oxide layer is particularly useful in some embodiments of the disclosure. For example, Si wire arrays did not yield high pattern fidelity when the catalyst was not confined using the patterned oxide layer as described above.

The growth of Si nanowires at 800-900° C. with $SiCl_4/H_2$ has been described in A. I. Hochbaum, R. Fan, R. He, and P. Yang, Nano Lett. 5, 457 (2005) and I. Lombardi, A. I. Hochbaum, P. Yang, C. Carraro, and R. Maboudian, Chem. Mater. 18, 988 (2006). In another embodiment, the thickness of growth catalyst is proportional to the diameter of the wires being grown, so 500 nm of catalyst material produced about 1.5 μm diameter Si wires. This relatively thick catalyst layer, and/or the higher growth temperatures, led to a problem with growth catalyst migration if a buffer oxide was not present on the surface, in contrast to the Hochbaum and Lombardi references in which much thinner catalyst layers were used.

The growth of Si microwires according to embodiments of the disclosure have optimal growth temperatures of 1000-1050° C. At 950° C. and below, the wires either did not grow straight, grew intermittently straight with kinks, or grew straight but not aligned normal to the substrate. At 1075° C. and above, the wires grew straight and normal to the substrate, but significant destruction of the surface oxide was observed during the growth process, leading to a loss of the pattern fidelity.

The semiconducting substrate (e.g., a planar or micro- and/or nano-wire semiconducting array) is then coated with a catalytic coating to generate a photocatalyst. The term "photocatalyst" is meant to refer to any compound, device or assembly comprising any such catalytic compound in which irradiation of such compound with electromagnetic radiation of visible or ultraviolet wavelength results in the generation of conduction band electrons ($e_{cb}^-$) and valence band holes ($h_{vb}^-$) that can then undergo oxidation reactions at the catalyst surface with species such as water or other inorganic and organic compounds. Various coating compounds may be used including platinum, nickel, nickel-molybdenum and the like. For example, transition metals with unfilled d-levels are useful or metals capable of having a stable oxidation state one unit lower or one unit higher, than the host semiconductor. The metal catalyst creates a narrow energy band within the original band gap allowing for the generation of holes in the valence band and electrons in the conduction band, which are required for photocatalytic oxidation/reduction. Suitable transition metals that can serve as catalysts include, but are not limited to, chromium, iron, nickel, manganese, copper, tungsten, cobalt, molybdenum, ruthenium, vanadium, zinc, silver, platinum, titanium and mixtures thereof.

Upon generation of the semiconducting substrate (e.g., a planar or micro- and/or nano-wire semiconducting array), a catalyst is deposited onto the substrate. In one embodiment, an electrocatalyst bath is prepared comprising a metal salt, where the metal component becomes the bulk of the active catalyst and the salt ion acts as a chelating and solubilizing agent. Stabilizers can be added to the bath and the pH adjusted as appropriate and empirically determined by one of skill in the art depending upon the catalyst and substrate being used. For example, in one embodiment, electrocatalyst plating baths comprise a Nickel(II) sulfamate salt, where the Ni component becomes the bulk of the active catalyst and the sulfamate ion acts as a chelating and solubilizing agent. To the solution of Ni(II) is added a small quantity of boric acid as a stabilizer, and the pH is adjusted using sulfamic acid or sodium hydroxide. Optionally, a small amount of molybdenum in the form of sodium molybdate ($Na_2MoO_4$) can be added. Addition of the latter results in improved catalytic activity for the resultant coating toward the hydrogen evolution reaction (HER), due to the formation of a high surface-area alloy of Ni and Mo on the electrode.

The Ni—Mo/sulfamate plating bath is similar to existing bath formulations, in that it involved the addition of $Na_2MoO_4$ to a Ni plating solution. However, the relative amount of Mo was lower; about 1-2% mol % relative to total metal content (e.g., ~1.5 mol % Mo relative to total metal content) in the sulfamate bath compared to that contained in alkaline Ni—Mo deposition baths (>10% Mo). Increases in the concentration of $MoO_4^{2-}$ substantially beyond 1.5% resulted in films that had poor adherence onto the Si electrode surfaces and also exhibited low activity for the HER. The Ni—Mo/sulfamate solution was stable over a period of months, with no evidence of changes in pH or formation of "molybdenum blue" precipitates.

The semiconducting substrate (e.g., the micro- and/or nano-wire semiconductive array) is immersed in the bath comprising the metal catalyst to be coated on the substrate. The substrate is then electroplated with the metal catalyst. The electrolytic plating technique comprises placing the photoelectrode on which the catalyst is to be plated into the bath described above, along with a suitable auxiliary electrode (e.g., Ni foil), where upon either a constant voltage (potentiostatic) or constant current (galvanostatic) is applied, using a potentiostat or another available current/voltage source. The magnitude of current that passes between the electrode of interest and the auxiliary electrode should be between about 1 and 100 mA (e.g., 5, 10, 20, 25, 30, 35, 40, 45, 50, 55, 60, 65, 70, 75, 80, 85, 90 or 95 mA) of cathodic current for every $cm^2$ of macroscopic surface area for the electrode of interest. The macroscopic surface area can be determined using, as a primary unit of measurement, a length scale, for example, a length scale discernible to the human eye (e.g., to tens to hundreds of micrometers). Also important is that the photoelectrode must be illuminated with a sufficient photon flux to permit all of the current that flows between its surface and the electrolytic plating solution to be resultant from excited charge carriers generated by the illumination.

In a further description of the coating process, an electroplating bath can be used to coat the semiconductor substrate. An electroplating apparatus adapted to electro-coat a metallic material onto the surface of a semiconducting substrate can be used. It is to be understood that the semiconducting substrate can comprise a typical photoresponsive device such as a diode, a photovoltaic cell, a light emitting diode, etc. which incorporates a photoactive junction. The term "photoactive junction" will be used herein as referring to a junction which includes at least one semiconducting material, said junction capable of either (1) generating current carriers, i.e. electrons and/or holes, or (2) conducting a current, in response to absorbed photons. Typically for coating purposes the semiconducting substrate includes (1) a metal substrate layer formed of an electrically conductive material such as stainless steel, (2) a layer of p-type conductivity semiconductor material disposed thereupon, and (3) a layer of n-type conductivity semiconductor material disposed atop and generally coextensive with the p-type semiconductor material. The p-type and n-type semiconductor layers form a p-n junction at the interface therebetween. Obviously, the process described by the instant invention is not limited to p-n semiconductor devices but, rather, may be utilized to electro-coat any semiconductor device having a photoactive junction. Furthermore, the method is not solely limited to electroplating but may be utilized in conjunction with any electro-coating process wherein electrical current flows through a semiconductor device.

The n-type conductivity layer comprises the "first surface" (as used herein, the term "first surface" will refer to the light incident surface) of the semiconductor device. The semiconducting substrate is placed in a suitable container having an electroplating bath therein. Also placed in the container is a second electrode, referred to as a counter or auxiliary-electrode. The composition of the plating bath and the counter-electrode is dependent upon the particular metallic material being electroplated onto the semiconducting substrate. A source of electrical current such as a battery that has one terminal electrically connected to the counter electrode via a wire, while the other terminal is directly connected via a wire to the metal substrate thereby completing an electrical circuit through the electroplating bath.

Also included in the electroplating apparatus is a light source. The light source can comprises a lamp, such as a quartz halogen lamp, and a reflective shield adapted to direct the radiation from the lamp toward the first surface of the semiconductor device. Other light sources may be used, for example, arc lamps, fluorescent lamps, or even sunlight may be utilized, the only proviso being that the source of illumination be capable of producing wavelengths of light which will be absorbed by the photoactive junction of the semiconductor device to create carrier pairs in the region of the photoactive junction. It is these carrier pairs which permit the semiconducting substrates to pass an electrical current without being degraded or destroyed.

As is obvious from the foregoing, illumination must reach the photoactive junction, to generate carrier pairs. If the semiconducting substrate is illuminated from the same side upon which the electro-coated deposit is being formed, the growing deposit can "shade" the underlying junction and thereby decrease the rate of electro-coating. This self-limitation is generally not a problem if: (1) the electrocoated deposit is relatively transparent, or (2) the device is illuminated from the side opposite that being electro-coated.

Since the photovoltaic junction of a photovoltaic device generates a potential under illumination, it is adapted to provide a flux of electrical current. This photogenerated current flux may be utilized to form an electro-coated deposit upon the surface of the semiconducting substrate.

The disclosure also provides an artificial photosynthetic system that utilizes sunlight and water as inputs and produces hydrogen and oxygen as the outputs. The system comprises three distinct primary components: a photoanode, a photocathode, and a product-separating but ion-conducting membrane (see, FIG. 13). These components may be fabricated and optimized separately before assembly into a complete water-splitting system. The system may incorporate two separate, photosensitive semiconductor/liquid junctions that collectively generate the 1.7-1.9 V at open circuit necessary to support both the net oxidation and reduction of water to $O_2$ and $H_2$, respectively.

The photoanode and photocathode may comprise arrays of semiconductor structures comprising Ni or Ni—Mo, as described above, and comprise high aspect ratio structures such as rods or wires. The semiconductor structures comprise a nickel (Ni) or nickel-molybdenum (Mo) catalysts disposed on the semiconductor structures, which can be used to drive the oxidation or reduction reactions at low overpotentials. Typically the catalyst coated on the semiconducting structures/substrates do not block or inhibit light energy from contacting the semiconducting substrate. Accordingly, the catalyst should cover from about 1-99% of the surface area unless sufficiently transparent to allow light penetration to the underlying semiconducting substrate. The high aspect-ratio semiconductor rod electrodes allow for the use of low cost, earth abundant materials without sacrificing energy conversion efficiency due to the orthogonalization of light absorption and charge-carrier collection. Additionally, the high surface-area design of the rod-based semiconductor array electrode inherently lowers the flux of charge carriers over the rod array surface relative to the projected geometric surface of the photoelectrode, thus lowering the photocurrent density at the solid/liquid junction and thereby relaxing the demands on the activity (and cost) of the Ni or Ni—Mo electrocatalysts. A flexible composite polymer film may be used to allow for electron and ion conduction between the photoanode and photocathode while simultaneously preventing mixing of the gaseous products. That is, the rod arrays may be embedded in flexible, polymeric membrane materials, allowing the possibility of roll-to-roll system assembly. Separate polymeric materials may be used to make electrical contact between the anode and cathode, and also to provide structural support. Interspersed patches of an ion conducting polymer may be used to maintain charge balance between the two half-cells.

In a particular embodiment, the photocathode may comprise vertically (or near vertically) aligned rod arrays made of macroporous p-Si <100> with a resistivity of 13-15 Ωcm and coated with Ni and/or Ni—Mo.

In another embodiment, the photoanode and photocathode components may be electrically, and ionically, interconnected through, but physically separated by, a flexible composite polymer film. Further, multi-component membranes, composed of polymeric materials, that exhibit desired mechanical pliability, electronic conductivity, and ion permeability properties for a feasible water electrolysis system may be used. Specifically, polypyrrole may be used to make electrical contact between the anode and cathode, while poly (dimethylsiloxane) (PDMS) may be used to provide structural support for the semiconductor rod arrays (in the manner as described above). For proton conduction in a cell operated under acidic conditions, Nafion may be employed, whereas vinylbenzyl chloride modified films of poly(ethylene-co-tetrafluoroethylene) (ETFE) may be used for hydroxide conduction in a cell operated under alkaline conditions.

The following examples are meant to illustrate, not limit, the disclosed invention.

EXAMPLES

Fabrication of Electrodes

Si wafers of (100) orientation and p-type doping with resistivities, ρ, of ~0.7 Ωcm (p-Si), were obtained from Silicon Inc. Degenerately doped p-type, (111)-oriented Si wafers with ρ<0.001 Ωcm (p$^+$-Si) were obtained from Silicon Quest International. Si microwire arrays were grown on p$^+$-Si substrates by an atmospheric pressure chemical vapor deposition (CVD) technique that used Cu as a vapor-liquid-solid (VLS) growth catalyst. The hexagonal wire pattern was determined by the pattern of the Cu, which was defined by evaporation and lift-off of Cu into lithographically etched holes in a SiO$_2$ buffer layer on the Si substrate. For wire growth, SiCl$_4$(g) was the Si source and BCl$_3$(g) was the boron source, resulting in p-type doping of the crystalline Si microwires. After growth, the microwire arrays were etched to remove the Cu growth catalyst from the wire surfaces.

Catalyst Removal.

The Cu growth catalyst was removed from the tops of the Si microwires before subsequent deposition with metal catalyst, using the following procedure. First, samples were etched in buffered HF for 10 s, rinsed with >18 MΩ water and dried. The samples were then submerged for 15 min in an RCA2 etching solution (6:1:1 H$_2$O:HCl:H$_2$O$_2$) at 70° C., rinsed, and dried. The process was then repeated, followed by a third 10 s buffered HF etch. Finally, the samples were treated with 30 wt % KOH(aq) at room temperature for 30 s, rinsed and dried a final time.

Planar p$^+$-Si electrodes, and all Si microwire array electrodes, were fabricated by a multistep procedure in which the wafer/array was first scribed and cut into pieces that were ~5 mm on a side. An ohmic back contact was then formed by use of a diamond scribe to scratch a Ga/In eutectic mixture (Aldrich) onto the unpolished back sides of the pieces. The pieces were then affixed to tinned copper wire using silver paint (SPI, Inc.), and allowed to dry overnight. The resulting electrode material was sealed onto a glass capillary using a 2-part epoxy (Hysol 1C; chosen for chemical stability). The final electrode area was defined using Hysol 9460 epoxy (chosen for dark color and high viscosity before curing). Planar p-Si electrodes were fabricated according to the same process, except that the back, ohmic contact was provided by sputter-deposition of ~500 nm of aluminum, followed by heating the sample for 10 min at 450° C. under vacuum. Immediately prior to use, all of the Si electrodes were etched in aqueous NH$_4$F/HF (buffered HF, Transene) until the surfaces were hydrophobic, indicating the removal of surface Si oxides and the formation of surface Si hydrides.

Deposition of Electrocatalysts.

Deposition of Ni or Ni—Mo. Ni was electrodeposited from a sulfamate solution comprising 325 g L$^{-1}$ Ni(II) sulfamate and 30 g L$^{-1}$ H$_3$BO$_3$, with the pH adjusted to ~4.0 using KOH. For deposition of Ni—Mo, 5 g L$^{-1}$ Na$_2$MoO$_4$ was added to the above solution before final adjustment of the pH.

Electrodeposition was carried out either galvanostatically or potentiostatically, using a Gamry Reference 600 potentiostat/galvanostat. Depositions were performed in air, in a one-compartment cell, using a large area Ni counter electrode and a Ag/AgCl (1 M KCl, E°=+0.222 V vs. the normal hydrogen electrode, NHE) reference electrode.

Ni was deposited for 0.5-5 s onto planar Si electrodes by application of a bias sufficient to produce a cathodic current density of 20 mA cm$^{-2}$, resulting in passage of 10-100 mC cm$^{-2}$ of cathodic charge density. Ni—Mo deposition onto planar Si electrodes was performed for 5-180 s at a cathodic current density of 20 mA cm$^{-2}$, producing 100-3600 mC cm$^{-2}$ of cathodic charge density. Electrocatalyst deposition on Si microwire array electrodes was performed galvanostatically at 50 mA cm$^{-2}$ of cathodic current density, or was performed potentiostatically at a potential that produced ~20 mA cm$^{-2}$ of cathodic current density on the corresponding planar Si electrode surface. The range of total deposition times tested for Si microwire array electrodes was somewhat longer than for planar Si electrodes.

All p$^+$-Si electrodes were sufficiently conductive that they behaved like metals in the plating solution. In contrast, the p-Si photoelectrodes exhibited carrier depletion in the plating solution, which generated a barrier to cathodic current flow in the dark. These electrodes were therefore illuminated using an ELH-type tungsten-halogen light source that was placed immediately adjacent to the cell that contained the plating solution. The Si microwire electrodes were tilted at a slight angle relative to the incident light propagation vector, thereby providing sufficient absorbed photon flux to effect facile transfer of photogenerated charge carriers across the interface and thus enable photodeposition of the electrocatalyst.

The conditions and time intervals for electrocatalyst deposition produced a range of catalyst loadings on the Si surface, as observed by scanning electron microscopy (SEM). In some cases, the electrocatalysts were deposited in several stages, with HER testing between each stage, to observe increases or decreases in the catalytic activity as a function of increases in catalyst loading.

Deposition current efficiency (DCE) values for Ni—Mo and Ni from the sulfamate bath were determined by a modified anodic stripping voltammetry technique. First, catalysts were deposited using the conditions noted herein onto glass electrodes that had been coated with fluorine doped tin oxide (FTO). The result was a partially or completely opaque black coating. These electrodes were then rinsed, dried, immersed in 1 M $H_2SO_4$(aq), and the potential was swept from −0.25 V to +0.90 V vs. SCE at 50 mV $s^{-1}$, to strip the catalyst from the electrode surface. J-t and J-E data for the deposition and stripping processes, respectively, are shown in FIG. 11.

Complete or near complete removal of the catalyst was evidenced by the FTO-coated glass electrodes becoming transparent again after the anodic sweep. By integrating the total charge passed during the deposition and stripping processes, the DCE was estimated by use of Eq. (S1).

$$DCE = \frac{\int I_{strip} dt}{\int I_{dep} dt} \quad (S1)$$

$I_{strip}$ is the current passed during the course of catalyst stripping and $I_{dep}$ is the current passed during catalyst deposition. Measured DCE values and their standard deviations are set out in Table 1. In spite of relatively large standard deviations, it is clear that the DCE for Ni deposition from sulfamate bath was at least an order of magnitude larger than for Ni—Mo from an otherwise identical bath.

TABLE 1

DCE values for Ni and Ni—Mo deposition on FTO glass electrodes

| Electrode | Catalyst | Dep charge (mC) | Strip charge (mC) | DCE (%) |
|---|---|---|---|---|
| 5-1 | Ni | 83 | 88 | 106 |
| 6-1 | Ni | 16 | 12 | 75 |
| 7-1 | Ni | 12 | 10 | 83 |
| 8-1 | Ni | 17 | 17 | 100 |
| 9-1 | Ni | 12 | 14 | 117 |
| average | Ni | n/a | n/a | 96 ± 17 (1σ) |
| 5-4 | Ni—Mo | 127 | 4 | 3.2 |
| 6-4 | Ni—Mo | 25 | 1.3 | 5.1 |
| 7-4 | Ni—Mo | 323 | 8.1 | 2.5 |
| 8-4 | Ni—Mo | 22 | 0.8 | 3.6 |
| 9-4 | Ni—Mo | 181 | 5.5 | 3.0 |
| 10-4 | Ni—Mo | 39 | 0.7 | 1.8 |
| 11-4 | Ni—Mo | 675 | 13 | 1.9 |
| average | Ni—Mo | n/a | n/a | 3.0 ± 1.1 (1σ) |

Deposition of Pt.

Pt was deposited onto planar or microwire Si electrodes by electroless deposition or by electron beam (e-beam) evaporation. The electroless deposition of Pt was performed by placing a drop of 1 mM $K_2PtCl_6$(aq) in 0.5 M HF(aq) on the electrode surface for 2 min, followed by a thorough rinse with >18 MΩ resistivity $H_2O$(l). The HER performance of the electrode was then evaluated, and the process was repeated until the HER activity, as measured by the cathodic current density passed at a given potential (vide infra), reached a plateau or started to decrease. Generally the highest catalytic activity was observed after a total time of 4-6 min of plating. E-beam evaporation of Pt was performed under a vacuum of <$10^{-5}$ torr in a Denton Explorer evaporator system. Approximately 1 nm of Pt was evaporated onto a completely assembled electrode, at a deposition rate of 0.1-1 Å$s^{-1}$.

Characterization of Deposited Electrocatalysts.

Structural characterization of the various electrocatalyst deposits on Si electrodes was performed using a Zeiss model 1550 field-effect scanning electron microscope. To prepare samples for characterization by SEM, the glass tube in which the sample had been mounted was scribed and broken, to expose a length of bare Cu wire. The sample was then fixed to the sample stage, and to minimize charging effects, the bare Cu wire was electrically grounded to the stage. Electron micrographs were collected promptly after the current-potential behavior of the electrodes had been determined with regard to $H_2$(g) evolution.

Further structural characterization was performed using an FEI TF30UT transmission electron microscope (TEM) that was equipped with a HAADF STEM detector, an Oxford energy-dispersive x-ray detector, and a high-resolution CCD camera. For TEM analysis, a layer of catalyst was deposited onto a Si electrode and was subsequently scraped off with a stainless steel razor blade. The resulting powder was suspended in isopropanol and then drop cast onto a lacey carbon/Cu grid. Compositional and crystal phase data were collected using energy-dispersive X-ray spectroscopy (EDS) and electron diffraction, respectively. The SEM and TEM images were subjected to a minimum of post-processing, being limited to normalization of the white-balance to a level that produced optimal contrast in the images.

X-ray photoelectron spectroscopic (XPS) analysis was carried out using a Kratos Ultra DLD instrument that was equipped with a magnetic immersion lens with a spherical mirror and concentric hemispherical analyzers. All XP spectra were fit using a software package that was written in-house and minimized the $\chi^2$ fitting error with the Levenberg-Marquardt algorithm. Spectra were fit with Gaussian-Lorentzian line shapes above a Shirley background with no asymmetric profiles.

Electrochemical Measurements.

The activities of the various catalysts and the performance of photoelectrodes were measured using a Gamry Reference 600 potentiostat/galvanostat. Electrodes were evaluated in aqueous 0.2 M potassium hydrogen phthalate (KHP) with 0.5 M $K_2SO_4$ supporting electrolyte, buffered to pH 4.5 using KOH. This electrolyte acted as a stable pH buffer, produced a stable reversible hydrogen electrode (RHE) potential, and represented the best compromise between activity and stability for all of the systems tested in this disclosure.

Electrochemical experiments were performed in a two-compartment Pyrex cell equipped with a flat Pyrex window and with a saturated calomel electrode (SCE) reference (E°=+0.244 V vs. NHE, CH Instruments). A Pt mesh counter electrode was contained in a separate compartment that was isolated from the main cell compartment by a fine porosity frit. All of the electrochemical data were collected with fast stirring of the solution, to minimize mass transport effects and rapidly remove nucleated bubbles from the electrode surface.

The electrolyte was constantly bubbled with research grade $H_2$(g) (AirLiquide) to maintain a constant RHE potential, as determined by measurement of the open-circuit potential of a platinized Pt wire before and after each set of measurements. The RHE potential was consistently measured to be −505 mV±5 mV vs. SCE, in close agreement with the value predicted by the Nernst equation at pH 4.5. The measured RHE potential did not shift by more than ±1 mV over the course of several hours of measurements.

Electrodes were tested using cyclic voltammetry (CV) or linear sweep voltammetry (LSV), both at a scan rate of 20 mV s$^{-1}$. The current density versus potential (J-E) data were not corrected for any uncompensated resistance losses or for concentration overpotentials. In the case of CV, forward and reverse sweeps generally showed minimal hysteresis. Where hysteresis was observed, the data collected while sweeping from negative toward positive potentials (reverse sweep) was found to correspond better to steady-state polarization measurements, and thus were used for final analysis. LSV measurements generally began at a potential 300-800 mV negative of RHE, and ended just positive of where the electrode began to pass anodic current. The potential limits for cyclic voltammetry were set to prevent the passage of large anodic current densities. These precautions were taken to prevent the Si surface from oxidizing and to minimize anodic stripping of the non-noble catalyst particles from the electrode surface.

The photoelectrode performance was evaluated under simulated sunlight supplied by a home-built ELH-type tungsten-halogen light source. The light source was placed at a distance from the electrochemical cell sufficient to generate an incoming photon flux equivalent to 1 sun illumination, as measured by a Si photodiode (Thorlabs) that was calibrated relative to a NIST-traceable standard (Solarex).

Composition and Morphology of the Deposited Electrocatalysts.

SEM data for Ni, Ni—Mo and Pt electrocatalysts deposited onto planar Si electrodes. All three of the materials deposited on planar Si electrodes as nanoparticles, as indicated by SEM data (FIG. 2). The Ni particles nucleated and rapidly grew to ~100 nm in diameter, and coalesced into a continuous film as the deposition time increased from 0.5 s to 5 s. Electrodeposition of Ni—Mo produced somewhat smaller nanoparticles and smaller inter-particle distances than were observed for electrodeposited Ni. When the deposition time for the Ni—Mo films was increased from a few s to several min, the particles did not coalesce into a continuous layer, but instead formed multilayers composed of larger agglomerates of particles. These multilayers remained porous, as underlying layers of the electrodeposited Ni—Mo film were visible in the SEM.

In contrast, the electroless deposition of Pt produced a discontinuous nanoparticulate film. Increases in the deposition time, from 2 to 8 min, increased the density of Pt nanoparticles, eventually creating large island-like agglomerates that began to flake off of the Si surface. Deposition of Pt by electron beam evaporation, even of a nominally ~1 nm thick film, gave a film that was difficult to image clearly by SEM, but resulted in enhanced catalytic activity for the HER that was consistent with the deposition of Pt (vide infra).

TEM Data for Electrocatalysts Deposited onto Planar p-Type Si Electrodes.

TEM analysis of the Ni—Mo (FIG. 3) and Ni films indicated that the mean crystallite sizes in the deposits were ~5±2 and ~10±5 nm (1σ), respectively. Electron diffraction and EDS indicated that the Ni—Mo film was single phase, with a lattice spacing that closely matched the Ni face-centered-cubic lattice, and with a bulk composition of ~85% Ni/~15% Mo.

SEM Data for Electrocatalysts Deposited onto Si Microwire Arrays.

As probed by SEM, on p$^+$-Si microwire arrays, Ni, Ni—Mo, and Pt produced homogeneous and conformal deposits over the entire surface of the microwires (FIG. 4). In contrast, on p-Si microwires, the deposits were only evident by SEM on the bottom halves of the wires, but EDS analysis indicated that catalyst had deposited over the entire wire surface.

Dark Current-Density Vs. Potential Behavior of Electrodeposited Catalysts on Degenerately Doped Planar Si Electrodes.

Representative polarization data for electrodeposited Ni, Ni—Mo, and Pt on planar p$^+$-Si electrodes are depicted in FIG. 5 and are summarized in Table 2. The aggregate activities of the various catalyst materials were compared quantitatively based on the cathodic current density observed at a HER overpotential of 100 mV ($J_{dark,100}$). This measure of activity included both the electronic and geometric (surface area) contributions to the hydrogen evolution activity of the various deposits. Using this metric, the activities for the three catalyst systems on planar p$^+$-Si electrodes increased in the order Ni<Ni—Mo≤Pt.

TABLE 2

Figures of merit for p$^+$-Si dark electrocatalysis

| Electrode | Geometry | Catalyst | Dep time (s) | $J_{dark,100}$ (mA cm$^{-2}$) |
| --- | --- | --- | --- | --- |
| 15a | planar | none | 0 | 0.01 |
| 42a | wires | none | 0 | 0.02 |
| 14a | planar | Ni | 0.5 | 0.05 |
| 17 | planar | Ni | 5 | 0.12 |
| 39c | wires | Ni | 5 | 0.36 |
| 40a | wires | Ni | 1 | 0.46 |
| 18a | planar | Ni—Mo | 30 | 1.8 |
| 20b | planar | Ni—Mo | 90 | 6.3 |
| 35a | wires | Ni—Mo | 30 | 6.7 |
| 259-3 | wires | Ni—Mo | 60 | 10.4 |
| 38 | wires | Ni—Mo | 90 | 14.3 |
| 35c | wires | Ni—Mo | 180 | 20.8 |
| 26a | planar | electroless Pt | 120 | 0.8 |
| 26c | planar | electroless Pt | 360 | 4.5 |
| 41a | wires | electroless Pt | 120 | 1.4 |
| 42c | wires | electroless Pt | 240 | 5.5 |
| 41c | wires | electroless Pt | 360 | 12.2 |
| 23 | planar | e-beam Pt | N/A | 25.3 |
| 54 | wires | e-beam Pt | N/A | 35.0 |

Ni consistently showed the most negative onset potential of appreciable cathodic current density, reaching only J=0.12 mA cm$^{-2}$ at E=−100 mV vs. RHE when Ni had been electrodeposited for 5 s on to the p$^+$-Si surface. Shorter deposition times produced lower catalytic activity, and longer deposition times produced relatively smooth, continuous Ni films that had similar activities to the Ni data shown in FIG. 5. The J-E behavior observed herein for Ni on Si is very close to the behavior observed previously for the HER of Ni-plated Fe electrodes.

Ni—Mo alloy films on planar p$^+$-Si gave J-E responses that exhibited increasing catalytic activities over several min of deposition. Deposition for 20-30 s produced films with a single layer (as observed by SEM) of Ni—Mo deposit, and produced ~2 mA cm$^{-2}$ of cathodic current density for the HER at E=−100 mV vs. RHE. Deposition for >30 s produced films that had a multilayer structure and yielded HER current densities of >5 mA cm$^2$ at E=−100 mV vs. RHE.

The two techniques used to deposit the Pt electrocatalyst yielded different J-E responses on planar p$^+$-Si electrodes. The onset of cathodic current obtained for the electroless deposition of a Pt electrocatalyst deposit was similar to that observed for Ni—Mo that had been deposited on p$^+$-Si for 90 s, giving nearly 5 mA cm$^{-2}$ at E=−100 mV vs. RHE. As the potential was scanned more negative relative to RHE, the electroless Pt films produced a very linear J-E electrocatalytic response, indicating resistive behavior. In contrast, Pt films that had been deposited by electron-beam evaporation, although nominally only ~1 nm thick, were highly active electrocatalysts on p$^+$-Si for the HER, reaching J=20-30 mA cm$^2$ at E=−100 mV vs. RHE. Furthermore, at higher cathodic current densities, the e-beam deposited Pt films showed the expected exponential response rather than the linear response that was observed for electroless Pt deposits on p$^+$-Si.

Dark Current-Density Vs. Potential Behavior of Electrodeposited Catalysts on Degenerately Doped Si Microwire Array Electrodes.

The catalytic activities of Ni, Ni—Mo, and Pt, respectively, were considerably higher, but exhibited the same trend in relative activity, on p$^+$-Si microwire arrays relative to the activity on planar p$^+$-Si electrode surfaces (FIG. 6, Table 2). The J-E response of electroless Pt deposits was closer to that of e-beam Pt deposits on p$^+$-Si microwires than on the planar p$^+$-Si electrodes, but the J-E response was still relatively linear at large cathodic current densities.

Fast stirring and continuous bubbling of H$_2$(g) through the solution were required to obtain reproducible J-E responses for planar and microwire array p$^+$-Si electrodes. The J-E data generally proceeded cleanly through J=0 at E=0 vs. RHE under these conditions, but only using the LSV technique, beginning at negative potentials and proceeding in the positive direction. An exception was the case of Ni—Mo alloy electrodeposited onto p$^+$-Si microwires, which often passed through J=0 at E<0 vs. RHE, similar to the behavior observed previously with bulk Ni—Mo alloy cathodes as well as with electrodeposited Ni—Mo—Cd films.

Photoelectrochemical Behavior of Electrocatalysts on p-Si Electrodes.

Six metrics were used to evaluate the photoelectrochemical performance of Ni, Ni—Mo, and Pt, respectively, as electrocatalysts on illuminated planar p-Si or p-Si microwire array photocathodes in contact with pH=4.5 aqueous solutions (FIGS. 7, 8, Table 3). These metrics [Eqs. (1) to (6)] were:

$$V_{oc} = |E_{oc} - E_{RHE}| \quad (1)$$

$$J_{light,100} = J|_{E=E_{oc}-100\,mV} \quad (2)$$

$$J_{sc} = J|_{E_{RHE}} \quad (3)$$

$$J_{ph} = J|_{E_{RHE}-0.4\,V} \quad (4)$$

$$ff = \frac{P_{max}}{V_{oc} \cdot J_{sc}} \quad (5)$$

$$\eta_{H_2} = \frac{P_{max}}{P_{in}} = \frac{ff \cdot V_{OC} \cdot J_{SC}}{P_{in}} \quad (6)$$

a) the open-circuit voltage ($V_{oc}$, Eq. (1)), which indicates, relative to RHE, the maximum free energy that can be extracted from the photoelectrode, where $E_{oc}$ is the potential at which the photoelectrode passed no current; b) the apparent aggregate catalytic activity ($J_{light,100}$, Eq. (2)) measured as the cathodic current density passed at a potential 100 mV negative of $E_{oc}$; c) the short-circuit current density ($J_{sc}$, Eq. (3)), the current density at E=0 V vs. RHE; d) the light-limited photocurrent density ($J_{ph}$, Eq. (4)), measured as the current density at E=−0.40 V vs. RHE; e) the fill factor (ff, Eq. (5)), a measure of the "squareness" of the J-E response, where $P_{max}$ is the maximum product of J and E; and f) the thermodynamic efficiency for production of H$_2$(g) ($\eta_{H_2}$, eq (6)), where $P_{in}$ is the incoming light intensity, 100 mW cm$^{-2}$ for AM 1.5 simulated sunlight.

TABLE 3

Figures of merit for photoelectrodes

| Electrode | Geometry | Catalyst | Dep time (s) | $V_{oc}$ (mV) | $J_{light,100}$ (mA cm$^{-2}$) | $J_{sc}$ (mA cm$^{-2}$) | $J_{ph}$ (mA cm$^{-2}$) | ff | $\eta_{H_2}$ (%) |
|---|---|---|---|---|---|---|---|---|---|
| 45a | planar | no catalyst | N/A | 255 | 0.16 | 0.82 | N/A | 0.17 | 0.03 |
| 317-E0 | wires | no catalyst | N/A | 34 | 0.01 | 0.005 | N/A | 0.43 | 0 |
| 298-4 | planar | Ni | 0.5 | 340 | 0.28 | 10.0 | 19.0 | 0.11 | 0.4 |
| 298-8 | planar | Ni | 1 | 325 | 0.32 | 6.6 | 19.4 | 0.11 | 0.2 |
| 317-E1 | wires | Ni | 0.5 | 190 | 3.4 | 7.3 | 10.6 | 0.24 | 0.3 |
| 317-F2 | wires | Ni | 1 | 210 | 3.2 | 8.0 | 12.0 | 0.22 | 0.4 |
| 49 | planar | Ni—Mo | 20 | 140 | 7.9 | 11.6 | 15.6 | 0.22 | 0.4 |
| 46 | planar | Ni—Mo | 30 | 140 | 7.3 | 9.3 | 11.0 | 0.27 | 0.3 |
| 317D2 | wires | Ni—Mo | 20 | 145 | 5.7 | 6.8 | 8.3 | 0.33 | 0.3 |
| 317C2 | wires | Ni—Mo | 40 | 145 | 6.0 | 7.0 | 8.6 | 0.35 | 0.4 |
| 7c | planar | electroless Pt | 180 | 245 | 2.4 | 16.8 | 19.0 | 0.17 | 0.7 |
| 9b | planar | electroless Pt | 240 | 230 | 6.2 | 21.8 | 23.4 | 0.22 | 1.1 |
| 10c | planar | electroless Pt | 360 | 240 | 2.4 | 18.1 | 25.6 | 0.16 | 0.7 |
| 10d | planar | electroless Pt | 480 | 210 | 1.5 | 10.1 | 27.2 | 0.12 | 0.3 |
| 317G | wires | electroless Pt | 120 | 265 | 5.0 | 11.7 | 13.1 | 0.31 | 1.0 |
| 12 | planar | e-beam Pt | N/A | 0 | 23.3 | 0 | N/A | 0 | 0 |

Apparent Catalytic Activities.

The apparent catalytic activities for p-Si photoelectrodes, both in planar and microwire array forms, followed the same order, Ni<Ni—Mo≤Pt as was observed for these catalysts on un-illuminated p$^+$-Si electrodes. In general, however, the photoelectrodes required a more negative potential, (relative to $E_{oc}$) to produce a given current density than dark electrodes (relative to $E_{RHE}$) that had been deposited with the same catalyst material. The exception was Ni, which exhibited a somewhat more rapidly increasing onset of cathodic current density on illuminated p-Si photoelectrodes than on dark p$^+$-Si electrodes, especially when Ni had been deposited onto p-Si microwire array photocathodes.

X-ray Photoelectron Spectroscopic (XPS) analysis was performed to elucidate the state of the Si surface under various conditions of Pt deposition (FIG. 9). A planar p$^+$-Si sample coated with electroless Pt, from a 1 mM Pt(IV)/HF (aq) solution, showed markedly higher levels of oxidized Si than a bare Si control, or than a sample that had been coated with a deposit of e-beam evaporated Pt. These data strongly support the formation of an interfacial oxide on Si in the presence of Pt(IV) salts, which is consistent with the resistive behavior observed in the HER experiments.

Open-Circuit Potentials.

The $V_{oc}$ values for the photocathodes followed the order Ni—Mo<Ni<Pt on both planar and microwire arrays of p-Si. Additionally, for electrodeposited Ni, the $V_{oc}$ values were smaller by >100 mV on p-Si microwire arrays than on planar p-Si electrodes. Interestingly, the $V_{oc}$ values obtained for Pt on p-Si photoelectrodes were dependent on the method of Pt deposition. Electron-beam evaporated Pt films yielded ohmic contacts to planar p-Si, resulting in high catalytic activity but no photovoltage, whereas electroless Pt deposition gave the largest photovoltages observed for any of the electrocatalytic deposits studied herein on both p-Si planar and microwire arrays electrodes.

Short-Circuit Photocurrent Densities.

The observed $J_{sc}$ values for planar p-Si photoelectrodes generally were between 10 mA cm$^{-2}$ and 25 mA cm$^{-2}$, depending on the length of time that the catalyst had been deposited. These $J_{sc}$ values correspond to somewhat lower apparent quantum yields than have been observed for p-Si photoelectrodes under a controlled, monochromatic photon flux in contact with an aqueous methyl viologen (MV$^{2+/+}$) redox system, indicating that the catalyst particles absorbed and/or reflected some of the incident light.

$J_{sc}$ values for p-Si microwire array photoelectrodes were between 8 mA cm$^{-2}$ and 15 mA cm$^{-2}$ at normal incidence. These values increased when the electrode was tilted by ~35° relative to the propagation vector of the incident optical beam. These $J_{sc}$ values are close to the values that have been reported for p-Si microwire arrays in contact with MV$^{2+/+}$(aq), as well as for HER using a Pt electrocatalyst, suggesting minimal net absorption or reflection by the catalyst particles.

Overall Photoelectrode Performance.

The thermodynamically based light-to-H$_2$ photoelectrode efficiencies ranged from ~0.2% to ~1%, and increased in the order Ni≈Ni—Mo<Pt. Because the higher $V_{oc}$ values for Ni-decorated electrodes were offset by higher catalytic activities for Ni—Mo, Ni and Ni—Mo coated Si photocathodes exhibited similar overall efficiencies of 0.2-0.4%. The fill factors for the Ni—Mo deposited photoelectrodes were somewhat higher than fill factors for electrodes that had Ni deposits, which is also consistent with the higher catalytic activity of Ni—Mo relative to Ni. P-type Si microwire array photoelectrodes gave overall thermodynamically based efficiencies for H$_2$ production that were similar to those of the corresponding planar p-Si electrodes, due to the generally lower photocurrent densities of the microwire arrays compensated by higher fill factors relative to the planar p-Si electrodes.

Approximate external quantum yield (EQY) values for photoelectrodes were calculated by determination of the spectral photon flux from an ELH-type bulb at AM 1.5 via its measured emission spectrum. That photon flux was used to calculate an upper bound current density of 44 mA cm$^{-2}$ for a Si electrode absorbing all photons above its bandgap (1.1 eV) and collecting all of those photons as current (EQY=100%). J-E data for Si photoelectrodes were then normalized to this upper bound value to determine the EQY as a function of applied potential. Representative EQY-E data for a planar p-Si electrode and a p-Si microwire electrode, both deposited with Ni, are shown in FIG. 12.

The formation of active Ni—Mo catalyst films were obtained with relatively large cathodic deposition current densities (>10 mA cm$^{-2}$). At these current densities, bubbles were observed on the electrode surface, consistent with the simultaneous evolution of H$_2$ and deposition of Ni—Mo. The production of H$_2$(g) is consistent with a previously proposed deposition mechanism in which evolved H$_2$(g) reduces the intermediate Ni—Mo mixed oxide to a neutral alloy [Eqs. (7) to (10)].

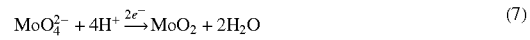

(7)

(8)

(9)

(10)

Increases in the deposition current density, to 100 mA cm$^{-2}$, resulted in thick, gray-black deposits that exhibited poor HER activity, and that readily dissolved in acidic solution. The behavior at high deposition current densities is consistent with the precipitation of Ni hydroxides, due to the increase in local pH effected by the vigorous evolution of H$_2$(g) in the poorly buffered plating solution.

The time period required to deposit single layers of Ni—Mo, compared to the deposition of Ni from the Ni/sulfamate bath, are also consistent with the co-evolution of H$_2$(g) during the deposition of Ni—Mo from the sulfamate solution. The deposition current efficiency of Ni-Mo from the sulfamate solution was <5%, as compared to nearly 100% under the conditions described below for Ni from the sulfamate solution. Consequently, the resulting films of Ni—Mo particles were generally discontinuous and contained micron-scale holes or inhomogeneities, likely due to H$_2$(g) bubbles blocking the surface from access to the plating solution.

When polished to minimize variations in relative surface area, a Ni—Mo alloy has been shown to produce slightly higher fundamental HER activity than Ni, but lower HER activity than bright (smooth) Pt. Relative to smooth bulk Ni—Mo surfaces, enhanced HER activity has been documented for electrodeposited Ni—Mo, as evidenced by an increased exchange current density and a decreased Tafel slope, apparently due to micro/nanostructuring of the electrocatalytic deposits. Notably, Ni—Mo coatings designed for maximum surface roughness have been reported to exhibit higher HER activities than smooth Pt, and are reported to be stable for >1 year in contact with alkaline electrolyte.

When used as a catalyst on Si photoelectrodes, the maximum acceptable thickness (and hence roughness) of Ni—Mo is limited by the requirement of minimizing absorption of the incoming light. The observed order of catalyst activity on Si cathodes, Ni<Ni—Mo<Pt (provided that the Pt was not deposited by a method that gave rise to resistive behavior), is thus in accord with expectations. For all of the catalysts deposited on electrodes of nominally the same projected area, the HER activities observed on a Si microwire array exceeded those on planar Si electrodes, consistent with the increased amount of catalyst per projected surface area on the microwire arrays relative to compact, planar electrode surfaces.

Relatively short electrodeposition times were required to reach maximum HER activity of Ni on p$^+$-Si, owing in part to the high deposition current efficiency of Ni on Si. Deposition times <1 s produced a discontinuous network of Ni particles, whereas longer times caused the Ni particles to coalesce into a smooth film. The increase in surface coverage of these smooth films was offset somewhat by a decrease for each particle of the area exposed to the electrolyte, so the catalytic activity increased only slightly, to a plateau, after a few s of deposition.

In contrast, when deposited for long periods of time, Ni—Mo did not produce coalescing, smooth films. Instead, Ni—Mo deposited in a multilayer structure that had a high surface roughness, which resulted from the small crystallite size of the deposits. The activity toward the HER for Ni—Mo films on Si therefore increased monotonically, up to rather long total deposition times. The Ni—Mo deposits thus provided relatively higher activity than pure Ni, likely due to a combination of slightly higher fundamental activity and substantially enhanced surface area.

Pt films that were produced by electroless deposition exhibited the highest activity after 4-6 min of deposition from a 1 mM Pt(IV) salt solution. The resulting morphology was a nanoparticulate network similar to that produced by the short-time deposition of Ni—Mo or Ni. However, the catalytic behavior of electroless Pt on planar $p^+$-Si at >10 mA cm$^{-2}$ was dominated by a large series resistance. This resistance was likely due to the formation of a barrier layer between the Si surface and the Pt nanoparticles.

A mechanism for the electroless deposition of Pt on Si involves the sacrificial oxidation of surface Si, and subsequent removal by HF [Eqs. (5) and (6)].

$$H_2PtCl_6 + Si^0 + 2H_2O \rightarrow Pt^0 + SiO_2 + 6HCl \quad (5)$$

$$SiO_2 + 6HF \rightarrow H_2SiF_6 + 2H_2O \quad (6)$$

Some oxidized Si sites may not be accessible to etching by HF, due to the presence of the Pt overlayer. As a result, the interfacial region between the Si and the electrolessly deposited Pt nanoparticles could have an insulating Si oxide, yielding the observed resistive behavior of the resulting electrodes. This hypothesis is consistent with the observations that (a) e-beam evaporated Pt exhibited no such resistive behavior, presumably because this deposition process did not involve the chemical oxidation of Si, and (b) electroless Pt deposits on Si microwires did not show such pronounced resistive behavior, because the greater surface roughness would provide many more parallel paths by which electrons might traverse the interface, resulting in a lower overall resistance of the catalyst-coated electrode.

The observed activity of a given electrocatalyst was higher on $p^+$-Si microwire arrays than on planar $p^+$-Si. These higher observed activities are consistent with the increased total amount of catalyst that resulted from microstructuring of the wire array electrode. Electron microscopy also indicated that the catalyst conformally coated the entire length of the $p^+$-Si microwires. The increase in observed activities for the Ni and Ni—Mo deposits on the Si microwire arrays was comparable to the surface roughness factor $\gamma$~6 of the particular Si microwire array electrodes used in this study. These observations indicate that the microstructured geometry effected a significant enhancement in the observed electrocatalytic activity. This enhancement is in addition to that provided from nanostructuring of the electrodeposited catalysts themselves, suggesting that roughness effects on the micro- and nano-scale are multiplicative (i.e. $Y_{total} = Y_{nano} \cdot Y_{micro}$). The observations also indicate a relatively facile mass transport of reactant and product species to and from the base of the microwires. The performance of the Ni—Mo catalyst on $p^+$-Si microwires approached the activity of e-beam evaporated Pt films on planar Si, which has been shown to possess sufficient catalytic activity to enable highly efficient hydrogen production on Si p-$n^+$ junction photoelectrodes.

Despite the higher catalytic activity of Ni—Mo relative to Ni, planar p-Si photoelectrodes coated with Ni or Ni—Mo showed mutually similar overall, thermodynamically based, efficiencies for the conversion of incoming simulated sunlight to $H_2(g)$. This behavior primarily resulted from the lower photovoltages exhibited by p-Si electrodes coated with Ni—Mo relative to p-Si photoelectrodes coated with Ni.

The difference in photovoltage between Ni and Ni—Mo coated Si photocathodes is consistent with the behavior expected from inherent differences in the energetics of the mixed Si-catalyst and Si-electrolyte interfaces. Both nanostructured systems are expected to operate in the regime of the "pinch-off" effect, in which the photovoltage generated by the p-Si/catalyst/electrolyte system of an appropriate geometry is dominated by the energetics of the interfacial region that has the larger barrier between the p-Si and the contacting phase. The geometry in which this effect is most beneficial (i.e. yielding the highest $V_{oc}$) is one in which the metal particles are widely separated from one another and have small areas of contact with the Si. Based on images collected from electron microscopy, the Ni—Mo nanoparticles were individually smaller, but made more extensive contact and were closer together on the Si surface, than the Ni nanoparticles. Hence, the Ni—Mo catalyst coating was likely to be less "pinched off," consistent with the lower photovoltages observed for Ni—Mo relative to Ni deposits.

The similarity in efficiencies for light-driven $H_2(g)$ evolution between p-Si/Ni and p-Si/Ni—Mo electrodes illustrates that an increased surface area of the catalyst film does not necessarily result in enhanced performance of photoelectrodes. A higher catalyst loading increases the turnover rates for a given electrode area, but also significantly influences other parameters of the system, including the interfacial energetics and the absorption of light by the semiconductor.

Pt films on p-Si exhibited perhaps the most interesting behavior of any of the three tested electrocatalyst materials. Electroless Pt deposition resulted in an interfacial oxide, which inhibited electron transport through the catalyst, enabling the pinch-off condition in which the Si/electrolyte barrier dominated the photovoltage. Conversely, e-beam evaporated Pt, with no interfacial barrier, produced sufficiently facile electron transfer through Si—Pt-electrolyte that the interfacial energetics were dominated by the ohmic contact to Pt, resulting in no photovoltage. An implication of this observed behavior is that Pt may not, in fact, be an appropriate material to couple directly with Si photocathodes for efficient $H_2$ evolution, as it forces a tradeoff between high catalytic activity (clean interface) and high photovoltage (barrier layer). Additional characterization of the Si/Pt interface, with strict control over catalyst geometry and morphology, would thus be a useful addition to the understanding of this system.

P-type Si microwire array photoelectrodes showed similar behavior to planar p-Si photoelectrodes, except that the catalytic activity was higher, and the photocurrent densities were markedly lower for the microwire array electrodes relative to the planar electrodes. The difference in observed photocurrent density is consistent with the lower photon flux absorbed by the as-prepared microwire array electrodes. Studies of light absorption have revealed the origin of the lower photocurrents in Si microwire arrays than in planar Si samples, and have demonstrated how incorporating light scattering/randomizing elements into the wire array structures can mitigate these effects. Additionally, enhanced control over the interfacial energetics of the p-Si/catalyst/electrolyte system would be beneficial to attain yet higher photovoltages than those reported herein and thus obtain corresponding increases in the efficiency of conversion of incident optical energy into $H_2(g)$.

Ni, Ni—Mo, and Pt catalysts have been deposited onto p-type and degenerately doped $p^+$-Si substrates in planar and microwire geometries. The two non-noble catalysts were both sufficiently active on p-type Si to give a net storage of incoming photon energy in the form of $H_2(g)$. Deposition of these catalysts onto Si microwire arrays enhanced the apparent activities due to increases in surface area. Ni—Mo alloy showed sufficient catalytic activity on the microwire arrays to make it a promising non-noble alternative to Pt.

Although a number of embodiments and features have been described above, it will be understood by those skilled in the art that modifications and variations of the described embodiments and features may be made without departing from the teachings of the disclosure or the scope of the invention as defined by the appended claims.

What is claimed is:

1. A photoelectrode comprising: a semiconducting substrate of nano- and/or micro-wires coated with a nickel-molybdenum metal catalyst.

2. The photoelectrode according to claim 1, wherein the semiconductive substrate comprises silicon.

3. The photoelectrode according to claim 2, wherein the photoelectrode is a photocathode.

4. The photoelectrode according to claim 1, wherein the semiconducting substrate comprises an array of nano- and/or micro-wires.

5. A photocell for conversion of water to hydrogen comprising: a photoanode comprising one or more ordered wire arrays comprising a plurality of elongate photoanode semiconductor wires, wherein the photoanode semiconductor wires are oriented to receive incident light; a photocathode comprising one or more ordered wire arrays comprising a plurality of elongate photocathode semiconductor wires, wherein the photocathode semiconductor wires are oriented to receive incident light; and a film electrically and ionically interconnecting the plurality of the photoanode semiconductor wires to a plurality of the photocathode wires and wherein the photocathode and/or photoanode are coated with nickel-molybdenum.

6. The photocell according to claim 5, wherein the film comprises a flexible composite polymer film.

7. The photocell according to claim 5, wherein the film prevents mixing of gaseous products.

8. The photocell according to claim 5, further comprising interspersed patches of an ion-conducting polymer.

9. A photoelectrode made by a process comprising: providing a electrocatalyst plating bath comprising a Nickel(II) sulfamate salt and sodium molybdate;

placing a semiconducting substrate comprising a plurality of nano- and/or micro-wires serving as an electrode and a suitable auxiliary electrode in the electrocatalyst bath;

applying a constant voltage or constant current to the semiconducting substrate; and exposing the semiconducting substrate to electromagnetic illumination, wherein the photoelectrode is coated with a photocatalyst comprising nickel-molybdenum.

* * * * *